United States Patent Office 3,759,830
Patented Sept. 18, 1973

3,759,830
METHOD OF PREPARING REACTION PRODUCTS OF HYDRAZINES, CARBON DISULFIDE AND ACYLATED NITROGEN COMPOSITIONS
Paul W. Vogel, Lyndhurst, Ohio, assignor to The Lubrizol Corporation, Wickliffe, Ohio
No Drawing. Continuation of abandoned application Ser. No. 871,071, Aug. 25, 1969, which is a division of application Ser. No. 731,363, May 17, 1968, now Patent No. 3,519,564, which in turn is a continuation-in-part of abandoned application Ser. No. 663,208, Aug. 25, 1967. This application Oct. 26, 1971, Ser. No. 192,319
Int. Cl. C10m 1/20, 1/36, 1/38
U.S. Cl. 252—51.5 A          9 Claims

ABSTRACT OF THE DISCLOSURE

Hydrazine (or substituted hydrazines) and carbon disulfide react with acylated polyamines (wherein the acylating agent is a carboxylic compound, preferably a succinic compound, containing at least about 20 carbon atoms) to produce compositions useful as corrosion and rust inhibitors for lubricants. The compositions contain heterocyclic compounds of the formula

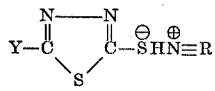

wherein Y is —SH or

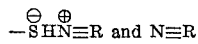

and N≡R is the acylated polyamine residue.

---

This application is a continuation of copending application Ser. No. 871,071, filed Aug. 25, 1969, now abandoned. Said copending application is a division of application Ser. No. 731,363, filed May 17, 1968, now U.S. Pat. 3,519,564, which is in turn a continuation-in-part of application Ser. No. 663,208, filed Aug. 25, 1967, now abandoned.

This invention relates to new compositions of matter useful as lubricant additives, particularly for corrosion and rust inhibition. More particularly, the invention relates to novel compositions of matter prepared by reacting (A) a compound of the formula

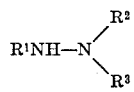

wherein $R^1$, $R^2$ and $R^3$ are hydrogen or hydrocarbon radicals, at least one of $R^1$, $R^2$ and $R^3$ being hydrogen; (B) carbon disulfide; and (C) an acylated nitrogen-containing composition characterized by the presence within its structure of (1) at least one acyl, acyloxy or acylimidoyl radical containing at least about 20 carbon atoms, and (2) a nitrogen-containing radical in which a nitrogen atom is attached directly to said radical (1), said nitrogen-containing radical being derived from an alkylene polyamine or a hydroxyalkyl-subsituted alkylene polyamine.

Modern lubricants, including engine oils, gear lubricants, automatic transmission fluids and the like, owe their efficiency in large part to the presence therein of numerous additives which improve various properties of the lubricant. Many of these additives, however, cause new problems of their own when they are added to the lubricant. For example, sulfur-containing compounds are often used to improve extreme pressure properties of lubricants, especially gear oils and the like, but these sulfur compounds have a strong tendency to cause corrosion of metal parts, especially bearings which may contain copper, silver or other sulfur-reactive metals. When contacted with ferrous metal surfaces, many of these additives contribute to the formation of rust thereon. Therefore, it is frequently necessary to add a corrosion-inhibiting or rust-inhibiting additive to the lubricant to counteract this tendency of other additives.

A principal object of the present invention, therefore, is to prepare new compositions of matter suitable for use as lubricant additives.

A further object is to prepare lubricant additives which protect metal surfaces from rust and corrosion, especially when caused by sulfur-containing additives.

Other objects will in part be obvious and will in part appear hereinafter.

Component A in the compositions of this invention is hydrazine or a substituted hydrazine. The corresponding hydrazine hydrate may also be used. For reasons of economy and particular suitability, unsubstituted hydrazine ($N_2H_4$) is preferred; but hydrazines substituted (either symmetrically or unsymmetrically) with one or more hydrocarbon radicals are also suitable. As used herein, the term "hydrocarbon radical" refers to alkyl, cycloalkyl, aryl, alkaryl and aralkyl radicals. Substantially hydrocarbon radicals, that is, radicals containing non-hydrocarbon substituents which do not detract substantially from the hydrocarbon character of the radical (e.g., ether, ester, nitro, and halogen groups), are considered to be equivalent to the corresponding hydrocarbon radicals and to be part of this invention.

Examples of substituted hydrazines are methylhydrazine, N,N-dimethylhydrazine, N,N'-dimethylhydrazine, phenylhydrazine, N - phenyl - N' - ethylhydrazine, N-(p-tolyl) - N' - (n-butyl)-hydrazine, N-(p-nitrophenyl)-N-methylhydrazine, N,N'-di-(p-chlorophenyl)hydrazine and N-phenyl-N'-cyclohexylhydrazine.

Component B is carbon disulfide. It may be used in the free state or in the form of carbon disulfide-producing compounds such as metal trithiocarbonates, dithiocarbamates or xanthates.

Component C is an acylated alkylene polyamine or hydroxyalkyl-substituted alkylene polyamine of the type disclosed in U.S. Pats. 3,219,666 and 3,272,746. The disclosures of both of these patents are incorporated herein by reference.

The polyamines used for the preparation of component C include, in general, alkylene amines containing about 10 or less alkylene groups joined through nitrogen atoms. They include principally the ethylene amines, propylene amines, butylene amines and homologs thereof, and also piperazines and aminoalkyl-substituted piperazines. Hydroxyalkyl-substituted alkylene polyamines are also contemplated for use in preparing component C. Typical examples of suitable amines are ethylene diamine, triethylene tetramine, pentaethylene hexamine, propylene diamine, tripropylene tetramine, di-(trimethylene) triamine, 1,4 - bis - (2-aminoethyl)piperazine, 1-(2-aminopropyl) piperazine, N-(2-hydroxyethyl)ethylene diamine, 1-(2-hydroxyethyl)piperazine, and 2 - heptadecyl - 1-(2-hydroxyethyl)-imidazoline. Mixtures of these amines may also be used.

The preferred amines are the polyethylene polyamines containing from two to about eight amino groups per molecule. A commercially available mixture of polyethylene polyamines containing an average of about 3-7 amino groups per molecule is particularly suitable.

The acylating agent used for preparing component C is a carboxylic acid-producing compound containing at least about 20 and preferably at least about 50 carbon atoms. By "carboxylic acid-producing compound" is meant an acid, anhydride, acid halide, ester, amide, imide, amidine or the like; the acids and anhydrides are preferred.

The acylating agent is usually prepared by the reaction (more fully described hereinafter) of a relatively low molecular weight carboxylic acid-producing compound with a hydrocarbon source containing at least about 20 carbon atoms. The hydrocarbon source should be substantially saturated, i.e., at least about 95% of the total number of carbon-to-carbon covalent linkages should be saturated. It should also be substantially free from pendant groups containing more than about six aliphatic carbon atoms. It may be a substantially hydrocarbon source, as defined hereinabove.

The preferred hydrocarbon sources are those derived from substantially saturated petroleum fractions and olefin polymers, particularly polymers of monoolefins having from 2 to about 30 carbon atoms. Thus, the hydrocarbon source may be derived from a polymer of ethylene, propene, 1-butene, isobutene, 1-octene, 3-cyclohexyl-1-butene, 2-butene, 3-pentene or the like. Also useful are interpolymers of olefins such as those illustrated above with other polymerizable olefinic substances such as styrene, chloroprene, isoprene, p-methylstyrene, piperylene and the like. In general, these interpolymers should contain at least about 80%, preferably at least about 95%, on a weight basis of units derived from the aliphatic monoolefins.

Another suitable hydrocarbon source comprises saturated aliphatic hydrocarbons such as highly refined high molecular weight white oils or synthetic alkanes.

In many instances, the hydrocarbon source should contain an activating polar radical to facilitate its reaction with the low molecular weight acid-producing compound. The preferred activating radicals are halogen atoms, especially chlorine, but other suitable radicals include sulfide, disulfide, nitro, mercaptan, ketone and aldehyde groups.

As already pointed out, the preferred hydrocarbon sources contain at least about 50 carbon atoms. Such higher molecular weight compositions may have dispersant properties when incorporated in a lubricant. Thus, among the olefin polymers those having a molecular weight of about 750-5000 are preferred, although higher polymers having molecular weights from about 10,000 to about 100,000 or higher may be used and frequently impart viscosity index-improving porperties to the compositions. Especially suitable as hydrocarbon sources are isobutene polymers within the prescribed molecular weight range, and chlorinated derivatives thereof.

Any one of a number of known reactions may be employed for the incorporation of the hydrocarbon source into the acid-producing compound to provide the required acylating agent. Thus, an alcohol of the desired molecular weight may be oxidized with potassium permanganate, nitric acid or a similar oxidizing agent; a halogenated olefin polymer may be reacted with a ketene; an ester of an active hydrogen-containing acid, such as acetoacetic acid, may be converted to its sodium derivative and the sodium derivative reacted with a halogenated high molecular weight hydrocarbon such as brominated wax or brominated polyisobutene; a high molecular weight olefin may be ozonized; a methyl ketone of the desired molecular weight may be oxidized by means of the haloform reaction; an organometallic derivative of a halogenated hydrocarbon may be reacted with carbon dioxide; a halogenated hydrocarbon or olefin polymer may be converted to a nitrile, which is subsequently hydrolyzed; or an olefin polymer or its halogenated derivative may undergo an addition reaction with an unsaturated acid or derivative thereof. This latter reaction is preferred, especially where the acid-producing compound is maleic acid or anhydride. The resulting product is a hydrocarbon-substituted succinic acid or derivative thereof. The reaction leading to its formation involves merely heating the two reactants at about 100-200° C. The substituted succinic acid or anhydride thus obtained, may, if desired, be converted to the corresponding acid halide by reaction with known halogenating agents such as phosphorus trichloride, phosphorus pentachloride or thionyl chloride.

For the formation of component C, the hydrocarbon-substituted succinic anhydride or acid, or other acylating agent, and the alkylene polyamine are heated to a temperature above about 80° C., preferably about 100-250° C. The process may in some instances be carried out at a temperature below 80° C. to produce a product having predominantly salt linkages. When the reaction is effected above 80° C., the product has predominantly amide, imide or amidine linkages. The use of a solvent such as mineral oil, benzene, toluene, naphtha or the like is often desirable to facilitate control of the reaction temperature.

The relative proportions of the acylating agent and the alkylene polyamine are such that at least about one-half the stoichiometrically equivalent amount of the polyamine is used for each equivalent of acylating agent. In this regard it will be noted that the equivalent weight of the alkylene polyamine is based upon the number of amine radicals therein, and the equivalent weight of the acylating agent is based on the number of acidic or potentially acidic radicals. (Thus, the equivalent weight of a hydrocarbon-substituted succinic acid or anhydride is one-half its molecular weight.) Although a minimum of one-half equivalent of polyamine per equivalent of acylating agent should be used, there does not appear to be an upper limit for the amount of polyamine. If an excess is used, it merely remains in the product unreacted without any apparent adverse effects. Ordinarily, about 1-2 equivalents of polyamide are used per equivalent of acylating agent.

In an alternative method for producing component C, the alkylene polyamine is first reacted with a low molecular weight, unsaturated carboxylic acid-producing compound such as maleic anhydride and the resulting intermediate is subsequently reacted with the hydrocarbon source as previousiy described.

The products formed by these reactions are characterized by the presence of at least one acyl, acyloxy or acylimidoyl radical. These radicals have the following structures, respectively (R' representing a hydrocarbon or other appropriate group).

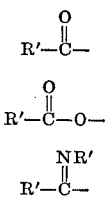

The compositions of this invention are prepared by reacting components A, B and C in any desired order. Thus, the acylated polyamine may be added to a mixture of the hydrazine and carbon disulfide, or the hydrazine may be added to the carbon disulfide-acylated polyamine mixture; usually, however, it is most convenient to form a mixture of the hydrazine and the acylated polyamine and add the carbon disulfide thereto. The relative proportions of the reactants are not critical, but it is generally convenient to use about 1-2 moles of carbon disulfide and about 1-5 equivalents of acylated polyamine per mole of hydrazine. (As applied to the acylated polyamine, the number of equivalents is based upon the number of basic nitrogen atoms remaining in the molecule and is generally most conveniently determined from the neutralization number of the composition.) When hydrazine itself is used as component A, the relative proportions are generally about 2 moles of carbon disulfide and about 1-2 equivalents of acylated polyamine per mole of hydrazine, for reasons more fully described hereinafter.

The reaction is often carried out in the presence of a solvent; this solvent may be the one which has been used for the preparation of component C and is frequently mineral oil, but may also be benzene, toluene, xylene, naphtha, hexane or the like. As the last of the three components is added to the mixture, an exothermic reaction occurs, which causes the temperature to rise, usually to about 50-60° C. After the addition is complete, the temperature may be raised to 100-200° C., preferably below about 150° C., to accelerate the reaction as evidenced by the evolution of hydrogen sulfide. The reaction is complete when hydrogen sulfide evolution ceases, and the product may then be filtered and the solvent removed. Generally, when the reaction is carried out in mineral oil it is neither desirable or necessary to remove the solvent, since the composition may suitably be incorporated in the lubricant in the form of an oil solution.

The precise molecular structure of the compositions of this invention is not known. It is believed, however, that when hydrazine is used as component A the composition contains a substantial proportion of compounds of the formula

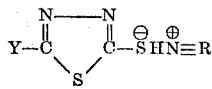

wherein Y is —SH or

and N≡R is a radical derived from an acylated alkylene polyamine, as described hereinabove. Thus, compounds of this formula are also contemplated as being part of the present invention. Other compounds which may be present include amine salts of dithiocarbamic acids.

When a monosubstituted hydrazine is used as component A, heterocyclic compounds of the structure given above are not possible but similar compounds having the following structure may be obtained (wherein R¹ is as defined above).

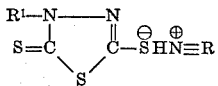

When a disubstituted hydrazine is used, various species may be present including heterocyclic compounds and amine salts of dithiocarbamic acids.

The preparation of the compositions of this invention is illustrated by the following examples.

EXAMPLE 1

A polyisobutenyl succinic anhydride, wherein the polyisobutene substituent has a molecular weight of about 900, is prepared by the reaction of chlorinated polyisobutene with maleic anhydride. To 1258 parts (2.24 equivalents) of this substituted succinic anhydride in 946 parts of mineral oil is added 190 parts (4.65 equivalents) of a polyethylene amine mixture containing an average of 3-7 amine groups per molecule. The mixture is heated at 150° C. under nitrogen for about five hours. The product is a 60% solution in oil of an acylated polyamine.

To 5100 parts (4.0 equivalents, based on unreacted amine groups) of the acylated polyamine and 620 parts of mineral oil are added 200 parts (4 moles) of hydrazine hydrate and 608 parts (8 moles) of carbon disulfide. Upon the addition of carbon disulfide, an exothermic reaction takes place which causes the temperature to rise to 68° C. Hydrogen sulfide is evolved as the temperature is raised to 145° C. over 3½ hours; the total hydrogen sulfide evolution is 165 parts. When hydrogen sulfide evolution has ceased, the mixture is heated at 100-145° C./15 mm. to remove volatile by-products and is then filtered, with the addition of 110 parts of filter aid. The product, a 50% solution in mineral oil, contains 4.80% sulfur and 3.2% nitrogen.

EXAMPLE 2

Following the procedure of Example 1, 2550 parts (2 equivalents) of acylated polyamine are reacted with 50 parts (1 mole) of hydrazine hydrate and 152 parts (2 moles) of carbon disulfide in 100 parts of mineral oil. The product, a 60% solution in mineral oil, is an amber liquid containing 2.96% sulfur and 3.23% nitrogen.

EXAMPLE 3

The procedure of Example 1 is repeated, using 1 equivalent of an acylated polyethylene polyamine with an equivalent weight of 984, 1 mole of hydrazine hydrate, 2 moles of carbon disulfide and 345 parts by weight of mineral oil. The product, a 50% solution in mineral oil, contains 5.61% sulfur and 3.57% nitrogen.

EXAMPLE 4

An acylated polyethylene polyamine is prepared by the reaction of 189 parts (0.815 mole) of pentaethylene hexamine with 856 parts (1 mole) of polyisobutenyl succinic anhydride wherein the polyisobutenyl substituent has a molecular weight of about 750, and 685 parts of mineral oil. To 547 parts (0.8 equivalent) of this product and 229 parts of mineral oil are added 40 parts (0.8 mole) of hydrazine hydrate and 122 parts (1.6 moles) of carbon disulfide. The reaction is carried out as described in Example 1; after the volatile by-products have been removed, 224 grams of mineral oil is added and the solution is filtered. The product, a 40% solution in mineral oil, contains 5.68% sulfur and 3.62% nitrogen.

EXAMPLE 5

A product similar to that described in Example 1 is prepared from 1 equivalent of an acylated pentaethylene hexamine (the acyl group being a polyisobutenyl succinic anhydride wherein the polyisobutenyl group has a molecular weight of about 1050), one mole of hydrazine hydrate, 2 moles of carbon disulfide and 441 parts of mineral oil. The product, a 40% solution in oil, contains 8.17% sulfur and 4.58% nitrogen.

EXAMPLE 6

A product is prepared from 1915 parts (1.5 equivalents) of the acylated polyamine described in Example 1, 150 parts (3 moles) of hydrazine hydrate, 456 parts (6.0 moles) of carbon disulfide and 683 parts of mineral oil. The product is a 52.5% solution in mineral oil and contains 5.68% sulfur and 3.6% nitrogen.

EXAMPLE 7

One equivalent of a polyisobutenyl succinic anhydride wherein the polyisobutenyl radical has an average molecular weight of 850 is reacted with 1 equivalent of diethylene triamine in 160 parts of toluene. To a solution of 2 equivalents (based on unreacted amine groups) of this product in 100 parts of mineral oil is added 2 moles of carbon disulfide, followed by 1 mole of hydrazine hydrate. An exothermic reaction takes place upon the addition of the hydrazine hydrate; when the exothermic reaction ceases, the solution is heated to 150° C. and heating at this temperature is continued until hydrogen sulfide evolution has stopped. A product similar to that of Example 2 is obtained.

EXAMPLE 8

An acylated ethylene diamine is prepared by a method similar to that described in Example 7. One equivalent of this acylated amine is added to a mixture of 1 mole of hydrazine hydrate, 2 moles of carbon disulfide and 100 parts of mineral oil. The reaction mixture is heated to 150° C. after the initial exothermic reaction takes place. After hydrogen sulfide evolution has ceased, volatile by-products are removed under vacuum and a product similar to that of Example 1 is obtained.

EXAMPLE 9

An acylated di-(1,2-propylene) triamine is prepared by reaction of the polyamine with an equal number of equivalents of a polyisobutenyl succinic anhydride wherein the polyisobutenyl group has an average molecular weight of 850. Following the procedure of Example 1, 4 equivalents of this acylated polyamine are reacted with 1 mole of hydrazine hydrate and 2 moles of carbon disulfide. A similar product is obtained.

EXAMPLE 10

One mole of N-(2-hydroxyethyl)trimethylene diamine is reacted with 1.06 moles of the polyisobutenyl succinic anhydride of Example 7. Two equivalents of the acylated amine thus obtained are reacted with 1 mole of hydrazine hydrate and 2 moles of carbon disulfide, following the procedure of Example 1. A product similar to that of Example 1 is obtained.

EXAMPLE 11

An alkenyl succinic anhydride is prepared by the reaction of tetrapropylene with maleic anhydride. A solution in toluene of equivalent amounts of this tetrapropenyl succinic anhydride and triethylene tetramine is heated under reflux, with the removal of water as it is formed. The toluene is removed by heating at 155° C. under reduced pressure.

One equivalent of the acylated amine obtained by the above procedure is reacted with 2 moles of hydrazine hydrate and 4 moles of carbon disulfide, using the method described in Example 1. A product similar to that of Example 1 is obtained.

EXAMPLE 12

One equivalent of the polyisobutenyl succinic anhydride of Example 1 is reacted with 1.5 equivalents of the polyethylene polyamine of that example. Following the procedure of Example 1, 1 equivalent of the product is reacted with 1 mole of hydrazine hydrate and 2 moles of carbon disulfide, in 100 parts of mineral oil. There is obtained a viscous brown liquid which is a 60% solution in oil of the desired product; the sulfur content of the solution is 3.77% and the nitrogen content is 3.08%.

EXAMPLE 13

Following the procedure of Example 1, a product is obtained by reacting 1 equivalent of polyisobutenyl succinic anhydride (wherein the polyisobutenyl substituent has an average molecular weight of 1050) with 1 equivalent of the ethylene amine mixture of Example 1, in 160 parts of mineral oil. To 3116 parts (1 equivalent) of the product in 100 parts of mineral oil are added 50 parts (1 mole) of hydrazine hydrate and 152 parts (2 moles) of carbon disulfide. Upon heating to 150° C. and subsequently removing volatile by-products and filtering as in Example 1, there is obtained an amber liquid which is a 60% solution in oil of the desired product, and which contains 2.38% sulfur and 2.24% nitrogen.

EXAMPLE 14

To a solution of 1275 parts of the acylated polyethylene polyamine of Example 1 in 419 parts of mineral oil is added 46 parts (1 mole) of methylhydrazine and 152 parts (2 moles) of carbon disulfide. During the addition of the latter, the reaction temperature rises to 48° C. The mixture is heated for one hour at 45–50° C., and is then heated to 150° C. over 2½ hours. After hydrogen sulfide evolution has ceased, volatile by-products are removed by heating at 145° C./20 mm. Filter aid, 25 parts, is added and the product is filtered. There is obtained a 50% oil solution of the desired product with a sulfur content of 4.54%.

EXAMPLE 15

Following the procedure of Example 14, a product is prepared from 1275 parts (1 equivalent) of acylated polyethylene polyamine in 91 parts of mineral oil, 60 parts (1 mole) of N,N-dimethylhydrazine and 76 parts (1 mole) of carbon disulfide. The product, a 59% solution in oil, contains 2.73% sulfur and 2.84% nitrogen.

EXAMPLE 16

N,N'-dimethylhydrazine hydrochloride, 60 parts (0.45 mole), is neutralized by dropwise addition of 72 parts (0.9 mole) of 50% aqueous sodium hydroxide at 28–35° C. To the product are added 574 parts (0.45 equivalent) of the acylated polyethylene polyamine of Example 1 and 195 parts of mineral oil. Carbon disulfide, 68.5 parts (0.9 mole), is then added and the mixture is heated to 155° C. until hydrogen sulfide evolution has ceased. After filtration, there is obtained a 50% oil solution of the desired product which contains 4.4% sulfur and 2.86% nitrogen.

EXAMPLE 17

An acylated polyamine is prepared by the reaction of 1.25 equivalents of pentaethylene hexamine with one equivalent of a hydrocarbon-substituted succinic acid in which the hydrocarbon substituent is a polymer (molecular weight about 1800) of a mixture of $C_{6-8}$ olefins, following the procedure of Example 1. Two equivalents of this acylated polyamine is then reacted with one mole of hydrazine hydrate and two moles of carbon fins, following the procedure of Example 1. Two equivalents of this acylated polyamine is them reacted with tion; after dilution it contains 3.18% sulfur and 3.70% nitrogen.

EXAMPLE 18

Following the procedure of Example 1, an acylated polyamine is prepared from five equivalents of pentaethylene hexamine and four equivalents of isostearic acid. One equivalent of this polyamine is reacted with one mole of hydrazine hydrate and two moles of carbon disulfide, according to the procedure of Example 1, to form a product (60% solution in mineral oil) containing 2.90% sulfur and 4.36% nitrogen.

EXAMPLE 19

A polyisobutene having a molecular weight of 750 is chlorinated to produce a product having a chlorine content of 3.6% by weight. This product is converted to the corresponding nitrile by reaction with an equivalent amount of potassium cyanide in the presence of a catalytic amount of cuprous cyanide, and the nitrile is hydrolyzed with dilute sulfuric acid to produce a hydrocarbon-substituted carboxylic acid. One equivalent of this acid is then reacted with two equivalents of ethylene diamine under the conditions described in Example 1.

One equivalent of the acylated amine thus formed is reacted with one mole of hydrazine hydrate and two moles of carbon disulfide, using the procedure of Example 1. A similar product is obtained.

EXAMPLE 20

A methyl ester of a high molecular monocarboxylic acid is prepared by reacting a chlorinated polyisobutene having a molecular weight of about 1000 and a chlorine content of 4.7% with methyl methacrylate at 140–220° C. An acylated amine is then prepared by the reaction of one equivalent of this ester with four equivalents of triethylene tetramine at 110–200° C., according to the method of Example 1. One equivalent of the acylated polyamine thus obtained is reacted with one mole of hydrazine hydrate and two moles of carbon disulfide, following the procedure of Example 1, to form a composition of the present invention.

EXAMPLE 21

A dimethyl wax-substituted malonate is prepared by reacting dimethyl malonate with sodium ethoxide and then with a brominated wax having 75 carbon atoms per molecule. A mixture of two equivalents of the resulting diester and five equivalents of the polyethylene amine mixture of Example 1 is heated in xylene solution to form an acylated polyamine. The xylene is removed by distillation, and two equivalents of the product is dissolved in mineral oil and reacted with one mole of hydrazine hydrate and two moles of carbon disulfide according to the method of Example 1 to form a composition of the present invention.

EXAMPLE 22

Acrylic acid (1 equivalent) is reacted with 1 equivalent of a chlorinated polyisobutene having a molecular weight of 850 and a chlorine content of about 4.5%, the reaction temperature being 150–200° C. One equivalent of the resulting acid is reacted with 1.25 equivalents of pentaethylene hexamine at 180–200°, and one equivalent of the acylated polyamine thus formed is reacted with one mole of hydrazine hydrate and two moles of carbon disulfide according to the method of Example 1 to form a product of the present invention.

EXAMPLE 23

A carboxylic acid is prepared by the reaction of methyl heptacontanyl ketone with chloroform and sodium hypochlorite. One equivalent of this acid is reacted with 1.25 equivalents of the amine mixture of Example 1 at 180–210° C. to form an acylated polyamine, and one equivalent of this polyamine is then reacted with one mole of hydrazine hydrate and two moles of carbon disulfide according to the method of Example 1 to produce a composition according to the present invention.

The compositions prepared according to the foregoing examples are suitable for use as lubricant additives, as more fully described hereinafter. However, it may sometimes be desirable to modify these compositions by reacting them with various other compounds. Thus, post-treated products may be obtained by reacting the compositions of this invention with aldehydes, acids, epoxides, esters, lactones, sulfur, sulfides, amines, amides and numerous other reagents. The following examples illustrate the preparation of such products.

EXAMPLE 24

Hydrogen peroxide (30% by weight), 28 parts (0.25 mole), is added to 1129 parts (0.5 mole) of the product of Example 1. An exothermic reaction occurs during which the temperature rises to 52° C. The mixture is heated for one hour at 50–60° C. and for three hours at 100–130° C., and the volatile material is then stripped by heating at 150° C. under vacuum. Upon filtration, there is obtained a product containing 4.14% sulfur and 2.92% nitrogen.

EXAMPLE 25

Hydrogen peroxide (30%), 113 parts (1 mole), is added over one hour to a mixture of 1129 parts (0.5 mole) of the product of Example 1 and 146 parts (1 mole) of iso-octyl mercaptan. An exothermic reaction takes place and the temperature of the mixture rises to 85° C.; it is maintained at 90–100° C. for 3½ hours and the volatile material is then removed by heating at 150° C. under vacuum. The residue is filtered to yield a product containing 5.77% sulfur and 2.71% nitrogen.

EXAMPLE 26

A mixture of 1129 parts (0.5 mole) of the products of Example 1 and 8 parts (0.25 mole) of sulfur is heated at 145–175° C. for six hours. Hydrogen sulfide is evolved as the reaction takes place. The volatile material is stripped from the mixture at 180° C. under vacuum and the product is filtered. It contains 3.66% sulfur and 2.86% nitrogen.

EXAMPLE 27

A mixture of 1129 parts (0.5 mole) of the product of Example 1 and 103 parts (0.5 mole) of 2,2,5,5-tetramethyl-3,4-dithiahexanedial is heated at 100–165° C. for four hours under nitrogen. Water and other volatile materials formed during the reaction are removed by distillation. The product, after filtration, contains 5.51% sulfur and 2.87% nitrogen.

EXAMPLE 28

A mixture of 1129 parts (0.5 mole) of the product of Example 1 and 51 parts (0.5 mole) of triethylamine is heated at 100–125° C. for five hours, after which volatile materials are stripped under vacuum at 145° C. The product, after filtration, contains 4.17% sulfur and 3.04% nitrogen.

EXAMPLE 29

A mixture of 300 parts of the product of Example 1 and 200 parts of an amide formed from a mixture of tall oil acids having a high oleic acid content (at least 75%) is heated at 120–155° C. for six hours, and then at 150° C. under vacuum to remove volatile materials. The product, after filtration, contains 2.47% sulfur and 3.91% nitrogen.

EXAMPLE 30

A mixture of 1355 parts (0.6 mole) of the product of Example 1 and 20.4 parts (0.4 mole) of 90% formic acid is heated for 4½ hours at 100–150° C., and then at 150° C. under vacuum to remove volatile materials. The product, after filtration, contains 4.15% sulfur and 2.99% nitrogen.

EXAMPLE 31

Paraformaldehyde, 30 parts (1 mole), is added over 5 minutes to 1129 parts (0.5 mole) of the product of Example 1 at 60° C. An exothermic reaction occurs, causing the temperature to rise to 70° C. The mixture is heated for 3½ hours at 100–165° C. under nitrogen, with water and volatile materials being removed by distillation. The residue is filtered, yielding a product containing 4.11% sulfur and 3.01% nitrogen.

EXAMPLE 32

To 1129 parts (0.5 mole) of the product of Example 1 is added, over 5 minutes, 64 parts (1.1 moles) of propylene oxide. After the initial exothermic reaction is complete, the mixture is stirred for one hour at 35–45° C., and is then heated to 150–160° C. over 3½ hours and maintained at that temperature for two hours. Volatile material is removed at 160° C. under vacuum, and the residue is filtered to yield a product containing 3.31% sulfur and 2.95% nitrogen.

EXAMPLE 33

A mixture of 1129 grams (0.5 mole) of the product of Example 1 and 72.1 grams (1 mole) of β-propiolactone is heated for one hour at 75–100° C. and then for three hours at 140–185° C., under nitrogen. Water and volatile materials are removed by distillation during the reaction. After filtration, the product contains 3.86% sulfur and 2.93% nitrogen.

The additives of this invention can be effectively employed in a variety of lubricating compositions based on diverse oils of lubricating viscosity such as natural or synthetic lubricating oil, or suitable mixtures thereof. The lubricating compositions contemplated include principally crankcase lubricating oils for spark-ignited and compression-ignited internal combustion engines including automobile and truck engines, two-cycle engine lubricants, aviation piston engines, marine and railroad diesel engines, and the like. However, automatic transmission fluids, transaxle lubricants, gear lubricants, metal-working lubricants, hydraulic fluids, and other lubricating oil and grease compositions can benefit from the incorporation of the present additives.

Natural oils include animal oils and vegetable oils (e.g., castor oil, lard oil) as well as solvent-refined or acid-refined mineral lubricating oils of the paraffinic, naphthenic, or mixed paraffinic-naphthenic types. Oils of lubricating viscosity derived from coal or shale are also useful base oils. Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, etc.); alkyl benzenes (e.g., dodecylbenzenes, tetradecylbenzene, dinonylbenzenes, di-(2-ethylhexyl)benzenes, etc.); polyphenyls (e.g., biphenyls, terphenyls, etc.): and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$ Oxo acid diester of tetraethylene glycol. Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethyl-hexanoic acid, and the like. Silicon-based oils such as the polyalkyl-, polyaryl-, polyalkoxy-, or polyaryloxy-siloxane oils and silicate oils comprise another useful class of synthetic lubricants (e.g., tetraethyl-silicate, tetraisopropyl-silicate, tetra(2-ethylhexyl)-silicate, tetra-(4 - methyl-2-tetraethyl)-silicate, tetra-(p-tert-butylphenyl)-silicate, hexyl-(4-methyl-2-pentoxy)-disiloxane, poly-(methyl)-siloxanes, poly(methylphenyl)-siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans, and the like.

In general, about 0.05–20.0 parts (by weight) of the additive of this invention is dissolved in 100 parts of oil to produce a satisfactory lubricant. The invention also contemplates the use of other additives in combination with the products of this invention. Such additives include, for example, auxiliary detergent and dispersants of the ash-containing or ashless type, oxidation inhibiting agents, viscosity index improving agents, pour point depressing agents, extreme pressure agents, color stabilizers and anti-foam agents.

The ash-containing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed method for preparing the basic salts involves heating a mineral oil solution of an acid with a stoichiometric excess of a metal neutralizing agent such as the metal oxide, hydroxide, carbonate, bicarbonate, or sulfide at a temperature above 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, Cellosolve, Carbitol, ethylene glycol, stearyl alcohol, and cyclohexyl alcohol; and amines such as aniline, phenylenediamine, phenothiazine, phenyl-$\beta$-naphthylamine, and dodecylamine. A particularly effective method for preparing the basic salts comprises mixing an acid with an excess of a basic alkaline earth metal neutralizing agent, a phenolic promoter compound, and a small amount of water and carbonating the mixture at an elevated temperature such as 60–200° C.

Ashless detergents and dispersants are illustrated by the acylated polyamines useful as component C in the compositions of this invention, especially those containing at least about 54 carbon atoms; similar products prepared from other nitrogen compounds and described in U.S. Pat. 3,272,746; and reaction products of such compounds with other reagents including boron compounds, phosphorus compounds, epoxides, aldehydes, organic acids, and the like.

Extreme pressure agents and corrosion-inhibiting and oxidation-inhibiting agents are exemplified by chlorinated aliphatic hydrocarbons such as chlorinated wax; organic sulfides and polysulfides such as benzyl disulfide, bis(chlorobenzyl) disulfide, dibutyl tetrasulfide, sulfurized sperm oil, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dipentyl phenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate: Group II metal phosphorodithioates such as zinc dicyclohexylphosphorodithioate, zinc dioctylphosphorodithioate, barium di(heptylphenyl) phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

Tables I and II give examples of lubricants suitable for use in automobile, railroad diesel and aircraft engines. Lubricants A–F and H–K contain the compositions of this invention; lubricants G and L are included for comparison and do not contain the compositions of this invention. Table III gives examples of gear lubricants containing the compositions of this invention (lubricants N–T), and one which does not contain the compositions of this invention (lubricant U) for comparison.

TABLE 1

| Ingredient | Lubricant, parts by weight | | | | | | |
|---|---|---|---|---|---|---|---|
| | A | B | C | D | E | F | G |
| SAE 30 mineral oil | 95.57 | 95.87 | 95.67 | 95.47 | 94.33 | 96.47 | 96.07 |
| Reaction product of polyisobutenyl succinic anhydride with polyethylene polyamine mixture (3-7 amino groups per molecule) | 2.50 | 2.50 | 2.50 | 2.50 | 3.87 | 2.50 | 2.50 |
| Reaction product of polyisobutenyl propionic acid, pentaethylene hexamine and terephthalic acid | 0.32 | 0.32 | 0.32 | 0.32 | 0.50 | | 0.32 |
| Tetrapropylene-substituted succinic acid | 0.48 | 0.48 | 0.48 | 0.48 | | | 0.48 |
| Sulfurized 4-carbobutoxycyclohexene | 0.52 | 0.52 | 0.52 | 0.52 | 0.50 | 0.51 | 0.52 |
| Methylene-bridged polyalkyl phenol | 0.11 | 0.11 | 0.11 | 0.11 | 0.28 | | 0.11 |
| Paraldehyde | | | | | 0.0034 | | |
| Product of Example: | | | | | | | |
| 1 | | 0.20 | 0.40 | 0.60 | | | |
| 2 | 0.50 | | | | | | |
| 7 | | | | | | 0.52 | |
| 22 | | | | | 0.52 | | |
| Poly(alkylsiloxane) anti-foam agent (10% solution in kerosene) | 0.003 | 0.003 | 0.003 | 0.003 | 0.003 | 0.003 | 0.003 |

TABLE II

| Ingredient | Lubricant, parts by weight | | | |
|---|---|---|---|---|
| | H | J | K | L |
| SAE 40 mineral oil | 94.65 | 96.04 | | 94.52 |
| Aircraft grade mineral oil | | | 97.57 | |
| Reaction product of polyisobutenyl succinic anhydride with polyethylene polyamine mixture (3-7 amino groups per molecule) | 3.40 | | | 3.40 |
| Reaction product of polyisobutenyl propionic acid, pentaethylene hexamine and terephalic acid | 0.63 | 0.63 | 0.32 | 0.63 |
| Reaction product of polyisobutenyl succinic anhydride, pentaethylene hexamine and para-formaldehyde | | 0.59 | | |
| Oxyethylated pentaerythritol ester of polyisobutenyl succinic acid | | | 1.18 | |
| Calcium salt of tetrapropylenephenol-formaldehyde condensation product | | 1.68 | | |
| Sulfurized 4-carbobutoxycyclohexene | 0.50 | | 0.51 | 0.50 |
| Methylene-bridged polyalkyl phenol | 0.28 | 0.28 | | 0.28 |
| Triphenyl phosphite | | | | 0.66 |
| Paraldehyde | 0.003 | | | 0.003 |
| Product of Example: | | | | |
| 1 | 0.53 | | | |
| 14 | | 0.78 | | |
| 21 | | | 0.42 | |
| Poly(alkylsiloxane) anti-foam agent (10% soln. in kerosene) | 0.003 | 0.003 | 0.003 | 0.003 |

TABLE III

| Ingredient | Lubricants, parts by weight | | | | | | |
|---|---|---|---|---|---|---|---|
| | M | N | P | R | S | T | U |
| SAE 90 mineral oil | 93.67 | 93.52 | 93.85 | 93.85 | 93.57 | 93.71 | 93.82 |
| Sulfurized isobutene | 4.54 | 4.54 | 4.00 | 4.54 | 4.54 | 4.54 | 4.54 |
| Trisooctyl phosphate | | | 1.10 | | | | |
| Reaction product of hydroxypropyl O,O-di(4-methyl-2-pentyl)phosphorodithioate with phosphorus pentoxide and C$_{12-14}$ tertiary alkyl primary amine mixture | 1.32 | 1.32 | | 1.32 | 1.32 | 1.32 | 1.32 |
| Stearamide | 0.096 | 0.096 | | 0.906 | 0.096 | 0.096 | 0.096 |
| 1-(2-hydroxyethyl)-heptadecylimidazoline | 0.15 | 0.15 | | | | | 0.15 |
| Product of Example: | | | | | | | |
| 1 | | | 0.30 | | 0.117 | | |
| 3 | 0.15 | | | | | | |
| 9 | | | 1.00 | | | | |
| 25 | | | | | | 0.25 | |
| 32 | | | | | | | 0.11 |
| Copolymer of 2-ethylhexyl acrylate with N-(1,1-dimethyl-3-oxobutyl) acrylamide (40% solution in toluene) | | | 0.05 | | | | |
| Poly(alkylsiloxane) anti-foam agent (40% solution in kerosene) | 0.075 | 0.075 | | 0.075 | 0.075 | 0.075 | 0.075 |

The effectiveness of the compositions of this invention as corrosion inhibitors is shown by the results of a test in which a copper-lead bearing strip is submerged in the lubricant being tested at 160° C. while moist oxygen is passed through. The test period is 18 hours, after which time the bearing strip is removed and replaced by a second strip and the test is continued for 6 hours. At the end of this time, the bearing strips are rinsed in mineral spirits and the weight change is determined and reported as a percentage of the original strip weight. The following results were obtained.

| | Weight change, percent | |
|---|---|---|
| | 18 hrs. | 6 hrs. |
| Lubricant: | | |
| B | +0.5 | −14.0 |
| C | −0.1 | −9.1 |
| D | +0.6 | +16.0 |
| G[1] | +3.1 | +80.6 |

[1] Does not contain the composition of this invention.

The corrosion inhibition properties of the compositions of this invention were also evaluated in an engine test in which a standard 1-cylinder test engine with a 3.8-inch bore, a 3.75-inch stroke and 45.5-inch displacement is used. The test bearing is a copper-lead connecting rod bearing. The engine is operated for 80 hours under the following conditions.

| | | |
|---|---|---|
| Speed | r.p.m. | 3150±25 |
| Water-in temperature | ° F. | 190±2 |
| Water-out temperature | ° F. | 200±2 |
| Oil pressure | p.s.i.g. | 40±2 |
| Gas flow rate | c.f.h. | 86±4 |

After each 20-hour period, the engine is stopped and the weight loss of the test bearing is determined. The following results were obtained.

| | Weight loss, mg. | | | |
|---|---|---|---|---|
| | 20 hrs. | 40 hrs. | 60 hrs. | 80 hrs. |
| Lubricant: | | | | |
| H | 10.2 | 12.2 | 13.7 | 14.2 |
| L[1] | 22.0 | 24.1 | 28.1 | 30.1 |

[1] Does not contain the composition of this invention.

Further evaluation of the corrosion-inhibiting properties of a lubricant is furnished by the following copper corrosion test which is a modification of ASTM procedure D130. In this test, a polished copper strip is submerged in the lubricant being tested at 250° F. for three hours, washed with isooctane and dried. The copper strip is then examined to determine the amount of tarnish or corrosion, and is evaluated on a scale of 1, 2, 3 and 4 representing slight tarnish, moderate tarnish, dark tarnish and corrosion respectively. When tested by this method, Lubricants M, N and S gave ratings of 1 while Lubricant U (which does not contain the composition of this invention) gave a rating of 2.

The Spicer Moisture Corrosion Test is used to determine the moisture corrosion resistance characteristics of gear lubricants contaminated by water in the normal environment of an automotive rear axle. In this test, a sealed rear axle assembly is charged with 2½ pints of gear lubricant and one ounce of water and is operated at 2500 r.p.m. for four hours at 180° F. The temperature is then reduced to 125° F. and the unit is stored for seven days at this temperature, after which time the assembly is drained and the extent of corrosion is noted.

When tested by this method, the assembly lubricated with Lubricant R showed light spots of red and black oxide and some light brown oxide on the gasket edge. The unit operated using Lubricant U (which does not contain the composition of this invention) had a heavy oxide deposit on the gasket edge and a moderate to heavy oxide deposit over the remainder of the unit.

What is claimed is:

1. A method for preparing a composition of matter which comprises reacting, at a temperature below about 200° C., (A) a compound of the formula

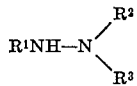

wherein each of $R^1$, $R^2$ and $R^3$ is hydrogen or an alkyl, cycloalkyl, aryl, alkaryl or aralkyl radical, at least one of $R^1$, $R^2$ and $R^3$ being hydrogen; (B) carbon disulfide; and (C) an acylated nitrogen-containing composition characterized by the presence within its structure of (1) at least one acyl, acyloxy or acylimidoyl radical containing at least 20 carbon atoms and having a maximum molecular weight of about 100,000, and (2) a nitrogen-containing radical in which a nitrogen atom is attached directly to said radical (1), said nitrogen-containing radical being derived from an alkylene polyamine containing up to about 10 alkylene groups joined through nitrogen atoms, or a hydroxyalkyl-substituted derivative of said alkylene polyamine; about 1-2 moles of component B and about 1-5 equivalents of component C being used per mole of component A.

2. The method of claim 1 wherein component A is hydrazine.

3. The method of claim 2 wherein the acyl, acyloxy or acylimidoyl radical of component C contains at least about 50 carbon atoms.

4. The method of claim 3 wherein component C is prepared by reacting a hydrocarbon-substituted succinic acid or anhydride with said alkylene polyamine.

5. The method of claim 2 wherein about 2 moles of component B and about 1-2 equivalents of component C are used per mole of component A.

6. The method of claim 3 wherein component C is prepared by reacting a polyisobutenyl succinic acid or anhydride with an ethylene polyamine.

7. A composition prepared according to the method of claim 6.

8. A composition prepared according to the method of claim 1.

9. A composition prepared according to the method of claim 3.

References Cited
UNITED STATES PATENTS
3,195,332   7/1965   Ranauto _____ 252—51.5 R WERTEN F. W. BELLAMY, Primary Examiner U.S. Cl. X.R.
260—302